Feb. 14, 1967   S. H. JANKOWSKI   3,304,099
KNOCKDOWN BICYCLE FRAME
Filed March 30, 1965
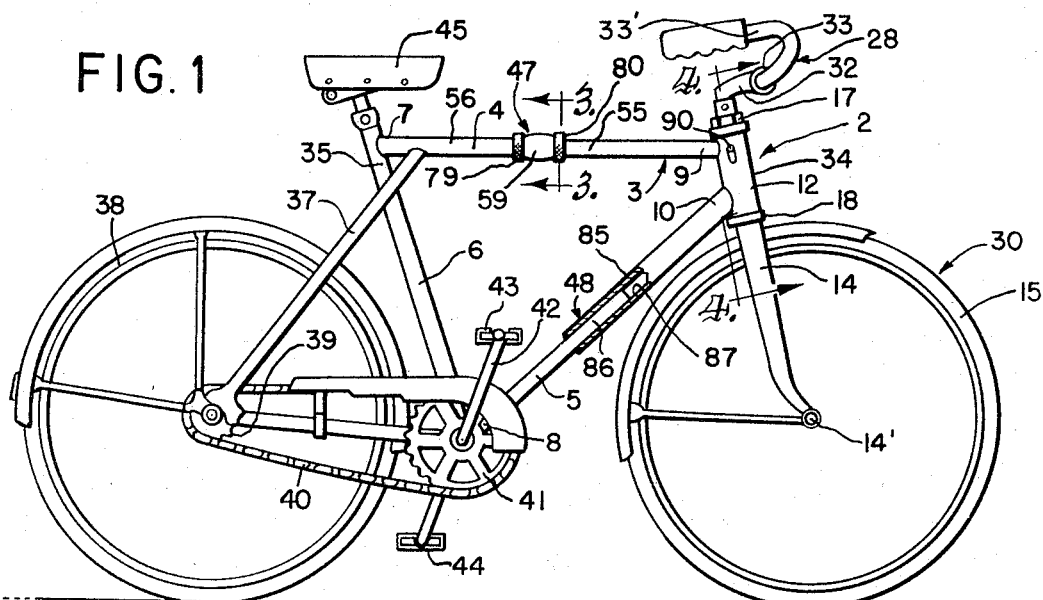
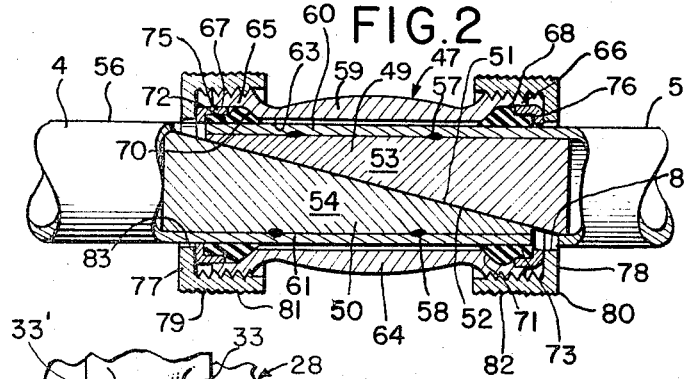
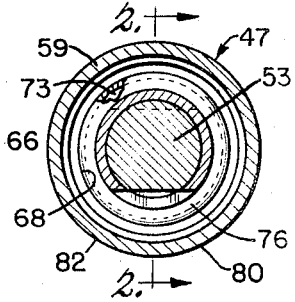
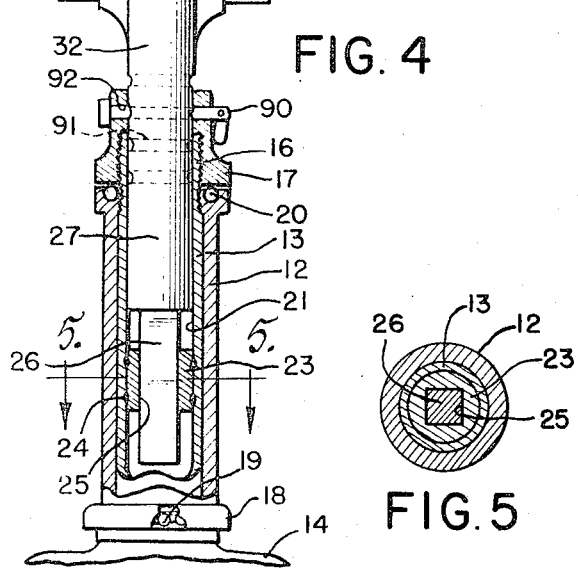
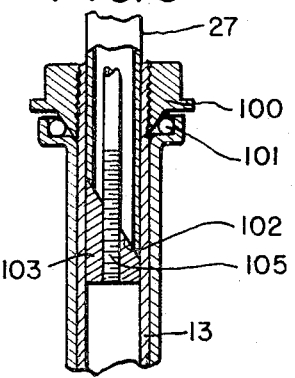
INVENTOR.
Stanley H. Jankowski
BY
John J. Kowalek
Attorney

United States Patent Office 3,304,099
Patented Feb. 14, 1967

3,304,099
KNOCKDOWN BICYCLE FRAME
Stanley H. Jankowski, 8201 N. Milwaukee Ave.,
Park Ridge, Ill. 60648
Filed Mar. 30, 1965, Ser. No. 443,845
7 Claims. (Cl. 280—287)

This invention relates to bicycles and more specifically to a novel collapsible bicycle.

Collapsible bicycles have been heretofore known, however, they have not become too popular, the reasons being that either the connections were too complicated for the average user, too costly or ineffective in that they fail to hold the parts securely together. Furthermore, the connections are subjected to shock loading which deteriorate the parts or bend or loosen them.

A general object of the invention is to devise novel shock proof connections for the frame of a collapsible bicycle.

A further object of the invention is to devise a connection for the separable frame members of a bicycle, in which the parts cooperate with a wedging action against a surrounding resilient coupling whereby when the bicycle is in use the parts are held tightly connected so as to prevent galling and consequent loosening.

Another object is to provide a connection utilizing a coupling having a tubular portion into opposite ends of which the frame portions to be connected are inserted, the frame portions having wedging engagement with each other such that end thrusts cause the parts to telescope into the tubular portion while reacting against surrounding resilient elastomeric elements clamped thereabout and stressing these resilient elements in shear as well as in compression.

The invention contemplates providing a novel collapsible bicycle in which the parts are easily dismantled and reassembled without tools.

These and other objects and advantages inherent in and encompassed by the invention will become more readily apparent in the specifications and the drawings, wherein:

FIGURE 1 is a side elevational view of a collapsible bicycle incorporating my invention;

FIGURE 2 is a longitudinal vertical sectional view on the scale of FIGURE 3 of the upper connecting means taken substantially on line 2—2 of FIGURE 3;

FIGURE 3 is an enlarged cross-sectional view taken substantially on line 3—3 of FIGURE 1;

FIGURE 4 is an enlarged longitudinal vertical sectional view of the handlebar connections taken essentially on line 4—4 of FIGURE 1;

FIGURE 5 is a cross-sectional view taken substantially on line 5—5 of FIGURE 4;

FIGURE 6 is a view similar to FIGURE 4 illustrating a modified embodiment.

Describing the invention in detail and having particular reference to the drawings, there is shown a bicycle generally designated 2 comprising a typical truss frame 3 having a top compression bar 4, a tension bar 5 and an upright column 6 interconnecting the rear ends 7 and 8 of the bars 4 and 5.

The forward ends 9 and 10 of bars 4 and 5 are connected by a neck or sleeve 12 through which there extends a turning shaft or spindle 13 of a front fork 14 which supports a front wheel 15 on an axle 14' in a typical well known manner.

The tubular spindle 13 has an upper threaded end 16 onto which there is threaded a collar nut 17 which secures the spindle 13 to the neck 12 and holds the lower collar 18 on the spindle 13 in engagement with the bearing assembly 19 at the lower end of the neck while the collar nut 17, which if desired may be coned, engages the upper bearing assembly 20 of the neck.

The interior 21 of the spindle 13 may be provided with a holder 23 welded as at 24 to the spindle intermediate its ends. The holder 23 has a nonround, preferably square central, vertical opening 25 which admits a complementary lower end extension portion 26 of a shank 27 of a handlebar assembly 28.

The portion 26 and holder 23 interlock in opening 25 to prevent relative rotation between the parts so that the front wheel and fork assembly generally designated 30 steer together.

The upper end of the shank 27 is provided with a typical goose neck 32 which has a clamp 33 adjustably secured to the transversely extending handlebars 33' intermediate the ends thereof.

It will be realized that the bicycle is divided into a front portion 34 and a rear portion 35 and that the rear portion incorporates the conventional rear fork 37 which mounts a rear or driving wheel 38 which has a conventional coaster brake and drive including a driven sprocket 39 which is powered by a chain 40 which is trained about a drive sprocket 41 which in turn is operated by a crank 42 fitted with foot pedals 43, 44. The crank is mounted through a sleeve (not shown) as well known and which joins the lower ends of the tension and column members.

The column member 6 adjustably supports a seat 45.

The connection between the front and rear portions of the bicycle is effected by upper and lower connecting means 47, 48.

The upper connecting means 47 comprises upper and lower wedge portions 49, 50 which engage along complementary upwardly and rearwardly sloping wedge surfaces 51, 52 of the solid inserts 53, 54 which are tightly fitted into the tubular front and rear sections 55, 56 of the compression bar 4 and tack welded thereto as at 57, 58, respectively.

A tubular or cylindrical coupling tube 59 ensleeves the overlapped cylindrical end portions 60, 61 of the sections 55, 56. The sleeve 59 has a longitudinal bore 63 which is of a diameter slightly larger than the diameter of the cylindrical bar 4.

The intermediate portion 64 of the sleeve 59 is of fusiform shape to provide a good handhold and opposite ends of the sleeve 59 are enlarged to provide externally threaded collars 65, 66 which provide enlarged bores 67, 68 open to the respective ends of the sleeve 59. The inner ends of the bores 67, 68 are conical shaped and taper toward the center portion of the sleeve and provide wedging surfaces 70, 71 which seat annular resilient, rubber or elastomer rings 72, 73 which are sleeved over the portions 60, 61 and are compressed thereagainst. The outer sides of the rings 72, 73 are engaged by flanged thrust rings 75, 76 which are engaged by the radial walls 77, 78 of the end caps 79, 80 which have externally knurled, axial portions 81, 82 threaded onto the collars 65, 66. Tightening of the caps 79, 80, which are apertured at 83, 84 in the end walls 77, 78 to loosely admit the portions 60, 61, deforms the rings 75, 76 causing them to tightly embrace said portions 60, 61 to prevent axial or transverse separation. Also endwise impacts on the bar 4 wedges the front and rear portions thereof against each other through the inserts 53, 54 whereby the elastomer material is stressed in shear and in compression thereby resisting shock loads.

Axial movement of the bar 4 is accompanied by similar movement of the telescoping front and rear or upper and lower portions 85, 86 of the tension bar 5, the lower portion 86 complementally fitting into the bore 87 in portion 85.

It will be readily apparent that to collapse the bicycle the cap or nut portions of the connector 47 are unthreaded to relax and expand the rings 72 and 73. The unit 47 is then moved axially onto either portion 55 or 56 and then lightly tightened to prevent its accidental loss.

The portions 85, 86 are separated and this is accommodated by the fact that the front portion of bar 4 is uppermost at the wedge whereby there is no interference to the separation. Then the handlebars are separated by withdrawing the pin 90 from any of the vertically spaced transverse apertures 91 in the stem 27 and the horizontally alignable aperture 92 in the holding nut 17.

In FIGURE 6 there is shown a conventional gooseneck connection and parts which correspond to that of the previous embodiment are identified with the same reference numerals. The fork spindle 13 has a bearing cone 100 threaded thereon and the cone fits into the bearing ring 101. The stem 27 has a sloped lower edge 102 which cooperates with a wedge nut 103 whereby the stem 27 and nut 103 expand laterally against the interior of the fork spindle 13 as the bolt 105 is threaded into the nut. Unthreading of bolt 105 loosens the nut 103 permitting withdrawal of the handlebars from the fork stem.

It will be realized that the portions 53, 54 may have instead of the wedge surfaces 51, 52 merely overlapping surfaces which would extend longitudinally of the bar 4 and preferably would be located in horizontal planes along the center line of the bar 4. Under such circumstances the rings 72, 73 would be stressed in shear upon relative movement of the portions 55, 56 lengthwise of the bar 4. These rings would be loaded in compression upon tightening of the end caps and sagging loads would stress these rings in compression.

A novel separable bicycle has been disclosed in the preferred embodiment illustrated and described, however, other forms of the invention will become readily apparent in view of this disclosure within the scope of the appended claims.

I claim:

1. A collapsible bicycle having a frame comprising a front part and a rear part including truss bars having bar portions disposable in end to end relation in the assembled position of the bicycle, means affording a connection between said front and rear parts and accommodating limited movement therebetween and comprising at least the portions of one of said bars having transversely extending wedge surfaces in wedging engagement with each other, said portions of said one bar having ends formed to have limited movement toward each other in the assembled and connected position of said parts, and quick-releasable rigid means embracing said portions about said wedge surfaces for holding the portions in assembled end to end relationship and in wedging engagement, said means comprising elastomer material stressed between said rigid means and said portions and yieldably accommodating relative movement of said portions longitudinally and transversely of the bar to absorb such movement producing shocks imposed upon the frame.

2. A knockdown bicycle frame comprising front and rear parts and interconnecting bars each having separable portions alignable in end to end relation in the assembled position of the frame, adjacent ends of the portions of at least one bar having faces engaging in a plane extending transversely of the bar, a rigid sleeve telescoped over the ends of said last-mentioned portions, elastomer material sleeved over the last-mentioned portions, and means deforming said elastomer material in compression between said rigid sleeve and respective last-mentioned portions, and the means interconnecting the other of said bars comprising telescoping complementary longitudinally slidable means accommodating relative longitudinal movement between the portions of the frame to effect distortion of said material to absorb shock impacts on the frame.

3. A knockdown bicycle frame comprising front and rear parts and interconnecting bars each having separable portions alignable in end to end relation in the assembled position of the frame, adjacent ends of the portions of at least one bar having wedge faces engaging in a plane extending transversely of the bar, a rigid sleeve telescoped over the ends of said last-mentioned portions, rings of elastomer material sleeved over the last-mentioned portions, and means deforming said rings of elastomer material in compression between said rigid sleeve and respective last-mentioned portions, and the means interconnecting the other of said bars comprising telescoping complementary longitudinally slidable means accommodating relative longitudinal movement between the portions of the frame to effect the aforesaid wedging action to absorb shock impacts on the frame.

4. In a knockdown bicycle, a frame having front and rear sections including tension and compression members each comprising separable portions disposed in end to end relation in the assembled position of the frame, said tension member extending diagonally downwardly and rearwardly from the front of the frame and said compression member extending generally horizontally, and shock absorbing first and second means releasably connecting the ends of the portions of the compression and tension members, respectively, said first means comprising segments of the contiguous ends of said compression member overlapped in the connected position of said frame sections and having limited relative movement longitudinally of said compression member in the connected position, a rigid sleeve telescoped over said segments, and elastomer material interposed between the segments and the encompassing sleeve and in absorbing shock loads deformable between said segments and said sleeve attendant to telescoping action of said segments.

5. The invention according to claim 4 and said elastomer material encompassing both segments, means providing wedging action for said material against said sleeve and said segments, and means adjustably loading said material to effect a tight connection between said segments and said sleeve.

6. In a knockdown bicycle frame having front and rear portions including a lower diagonal beam member and an upper generally horizontal beam member and each member having front and rear separable portions positionable in end to end relationship in the assembled position of the frame, said diagonal beam member having axially telescoping male and female elements disposed in telescoped position in assembly and separable by moving the front and rear portions diagonally with respect to the upper beam member, said upper beam member having overlapped segments at said ends of the portions thereof, and the segment of the front portion of the upper beam member overlying the segment of the segment of the rear portions of the upper beam whereby said segments separate transversely upon separation of the portions of the diagonal beam member, and means releasably interlocking said segments and including yieldable elastomer means stressed against said segments and deformable thereagainst attendant to said portions relatively moving, said elastomer material oriented to resist transverse separation of said portions and serving as shock absorbing means.

7. In a knockdown bicycle frame having front and rear portions including a lower diagonal beam member and an upper generally horizontal beam member and each member having front and rear separable portions positionable in end to end relationship in the assembled position of the frame, said diagonal beam member having axially telescoping male and female elements disposed in telescoped position in assembly and separable by moving the front and rear portions diagonally with respect to the upper beam member, said upper beam member having overlapped segments at said ends of the portions thereof, and the segment of the front portion of the upper beam member overlying the segment of the segment of the rear portions of the upper beam whereby said segments separate transversely upon separation of the portions of the diagonal beam member, and means releasably interlocking said segments, and said means interlocking said segments comprising a tubular element sleeved over the segments, rings of resilient material interposed between said tubular element and said segments, and caps threaded on the ends of the tubular element wedging said rings between said tubular element and said segments.

References Cited by the Examiner

UNITED STATES PATENTS

| | | | |
|---|---|---|---|
| 717,684 | 1/1903 | Humphreys | 287—105 |
| 2,447,956 | 8/1948 | Morders. | |
| 2,746,769 | 5/1956 | Hoogendoorh | 280—287 |
| 2,779,610 | 1/1957 | Risley | 285—369 X |
| 3,194,592 | 7/1965 | Boughton | 280—348 X |

KENNETH H. BETTS, *Primary Examiner.*